United States Patent [19]

Weiss

[11] 4,296,481
[45] Oct. 20, 1981

[54] STREAMER BULKHEAD

[75] Inventor: Benjamin F. L. Weiss, Houston, Tex.

[73] Assignee: Exploration Company, Houston, Tex.

[21] Appl. No.: 104,168

[22] Filed: Dec. 17, 1979

[51] Int. Cl.³ .............................................. G01V 1/38
[52] U.S. Cl. .................................. 367/20; 174/99 R; 174/101.5
[58] Field of Search .......................... 367/15,20,16–19; 174/101.5, 65 G, 152 G, 99 R, 153 G, 111

[56] References Cited

U.S. PATENT DOCUMENTS

| | | | |
|---|---|---|---|
| 3,376,948 | 4/1968 | Morrow | 367/18 |
| 3,611,975 | 10/1971 | Ashbrook | 367/17 |
| 3,648,642 | 3/1972 | Fetrow et al. | 367/16 |
| 3,996,414 | 12/1976 | Artbauer et al. | 174/111 |
| 4,002,822 | 1/1977 | Kurosaki | 174/153 G |

Primary Examiner—Howard A. Birmiel
Attorney, Agent, or Firm—Murray Robinson; Ned L. Conley; David Alan Rose

[57] ABSTRACT

A bulkhead for a marine seismic streamer section comprises a generally cylindrical body of rigid tough plastics material such as polycarbonate polymer, having an axial hole therethrough, through which passes the electric conductor bundle of the streamer section, and peripheral radial slots with hemicylindric bottoms receiving the tension lines of the streamer section. The bulkhead has an annular circumferential groove which is radially as deep as the axes of the bottoms of the slots and in which is disposed a belt of phosphor bronze, or stainless steel, or other strong corrosion resistant metal. The belt holds the tension lines in the slots and holds together the bulkhead, which is made of two sectors. One sector is greater than 180 degrees in extent and the other is less than 180 degrees in extent, e.g. the one sector may extend 240 degrees and the other 120 degrees. The split bulkhead is used as a replacement for one or more broken integral bulkheads in a streamer section, such section including a flexible outer tube with electrical and mechanical connection means at its ends, a plurality of mechanical tension lines extending inside the tube from one connector means to the other, a bundle of electrical conductors extending inside the tube from one end toward the other with electrical components connected to the bundle at intervals therealong, and bulkheads at intervals along the length of the streamer section. The bulkheads hold the outer tube in round and keep the tension lines and electric conductor bundle from tangling so that the streamer section can be wound on a reel.

9 Claims, 6 Drawing Figures

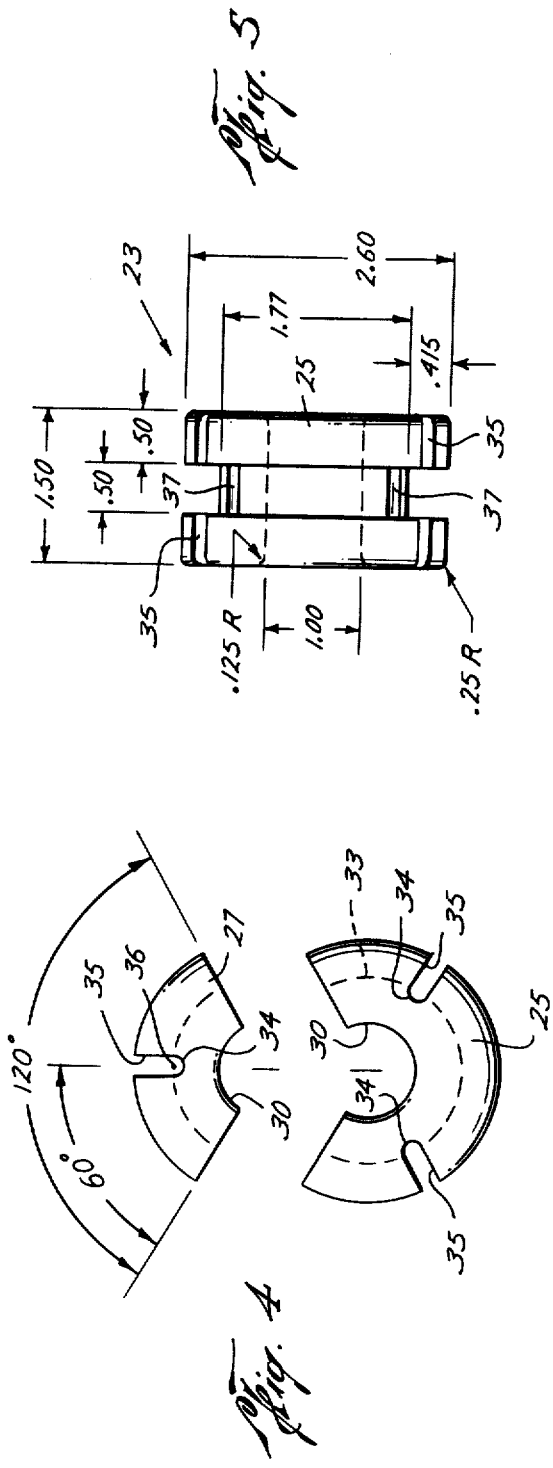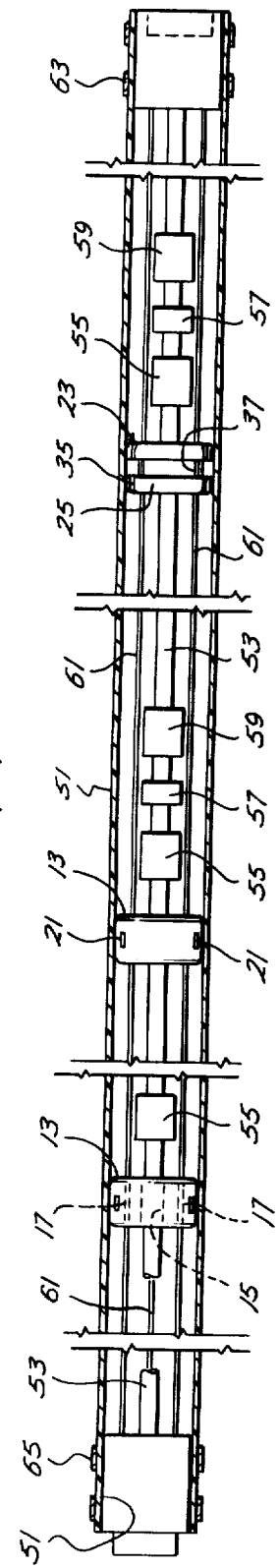

STREAMER BULKHEAD

BACKGROUND OF THE INVENTION

This invention relates to marine seismic detector arrays and more particularly to a replacement bulkhead for a marine seismic cable or streamer section.

A seismic cable may comprise one or more interconnected sections, each section including a flexible tube made, e.g. of plastics material, such as polyurethane or polyvinyl chloride, several inches in diameter and about one hundred to three hundred feet long, the tube having a wall thickness of about one-sixteenth of an inch. The tube houses hydrophones, depth transducers and other electrical components distributed along the length of the tube. Three steel lines inside the tube and extending the length thereof take tension load on the cable. At intervals of one or two feet along the length of the tube, bulkheads divide the cable section into compartments, within each of which is a group of electrical components. Electrical conductors connecting the electrical components with the end of the cable or with each other extend through a single center opening in each bulkhead. The three tension lines extend through three off-axial holes in the bulkhead, the holes being positioned with their centers 120 degrees apart around the circumference of the bulkhead. The remaining volume inside the tube is filled with oil to give the cable the desired positive, negative, or neutral buoyancy.

The bulkheads have cylindrical outer peripheries and fit closely within the tube, holding the tube open and cylindrical rather than allowing it to flatten out.

For a description of method and apparatus for assembling a seismic cable, see U.S. Pat. No. 3,885,286—Hill.

The bulkheads not only hold the tube in shape, but also keep the tension lines from becoming tangled, and provide buffers, to a certain extent protecting the electrical components from being impacted, e.g. when a seismic cable or streamer composed of perhaps several thousand feet of cable sections is wound up on a reel. The bulkheads are therefore also referred to as streamer spacers.

A repair problem arises when one of the bulkheads in a streamer section is cracked, broken or otherwise damaged, e.g. when the streamer is being wound on a reel. It is necessary to remove the tube, remove the broken spacer, and then in order to install a new spacer the electrical conductors and tension lines must be cut to enable them to be threaded through the new spacer. Since there are as many as 520 electrical conductors in a streamer section, the cost of such a repair, requiring splicing of electrical conductors, is almost prohibitive.

It is an object of the invention to solve the problem of repairing a streamer section having a damaged bulkhead.

SUMMARY OF THE INVENTION

According to the invention a repair bulkhead is provided comprising two unequal sectors which can be assembled about the electrical conductors and tension lines of a seismic streamer of cable section without the necessity of cutting the conductor or lines. The sectors, when assembled, form a complete ring, about which is placed a strap or belt to hold the sectors together. The ring has radial slots in its outer periphery to receive the tension lines. The bottoms of the slots are hemicylindric, to fit the tension lines. The groove about the ring is only as deep as the axes of the hemicylindric bottoms of the slots so that the slots continue right across the groove. The belt extends over the lines to hold the lines in the bottom of the slots. The belt is made of metal and the lines are soldered to the belt to prevent relative axial motion. Because the sectors of the ring are unequal, they will not slide relative to each other along the parting plane as would be the case if the ring were cut in half along a diametral plane.

BRIEF DESCRIPTION OF THE DRAWINGS

For a detailed description of a preferred embodiment of the invention, reference will be made to the accompanying drawings wherein:

FIG. 4 is an exploded end view of the two sectors of the bulkhead shown in FIG. 3;

FIG. 5 is a side view of the assembled sectors of FIG. 4; and

FIG. 6 is a pictorial view of a streamer section employing a bulkhead according to the invention.

The drawings are to scale. The conventions of the United States Patent and Trademark Office in patent cases have been employed to indicate materials.

DESCRIPTION OF PREFERRED EMBODIMENT

(a) Prior Art

Figure 1:
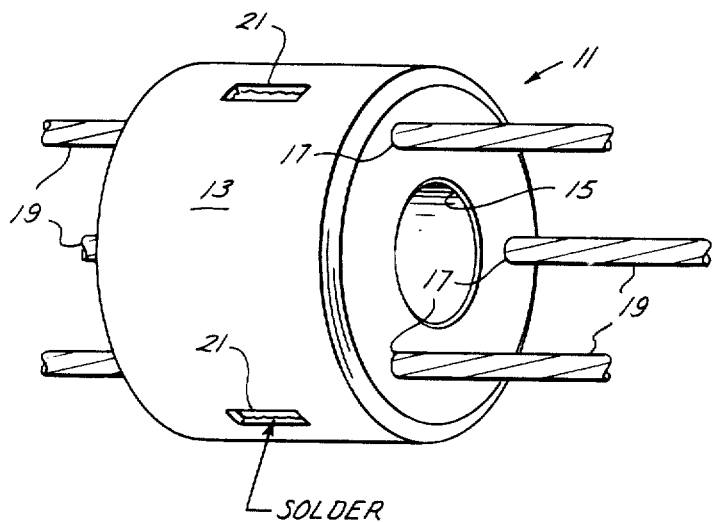
FIG. 1 is a pictorial view of a prior art bulkhead, showing same assembled with three tension lines.

Referring first to FIG. 1 there is shown a bulkhead 11 comprising a cylindrical body 13 having an axial hole 15 through which electrical conductors (not shown) may extend. A plurality of off-axial holes 17 extend through the bulkhead, tension lines 19 being threaded therethrough. Windows 21 in the outer periphery of the bulkhead enable solder to be deposited therethrough onto the tension lines to interlock the tension lines and the bulkhead and prevent relative axial motion.

(b) Invention

Figure 2:
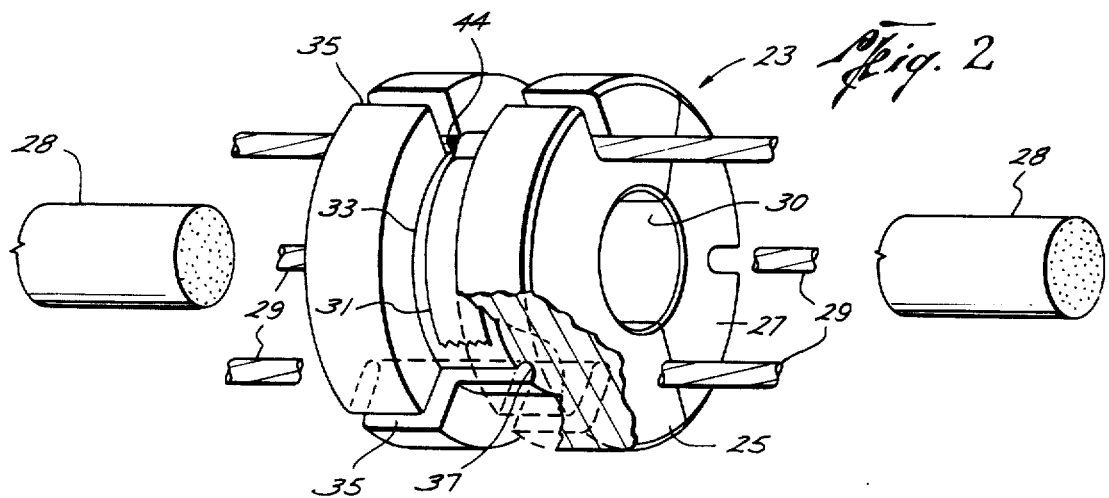
FIG. 2 is a view similar to FIG. 1 except showing a bulkhead embodying the invention.
Figure 3:
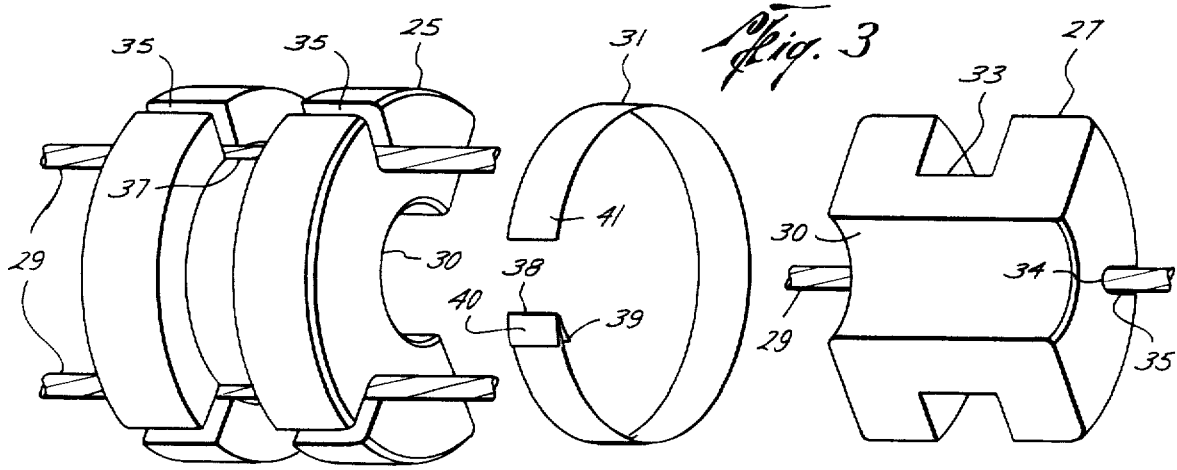
FIG. 3 is an exploded view of the construction shown in FIG. 2.

Referring now to FIGS. 2, 3 and 4, there is shown a bulkhead 23 according to the invention comprising a major sector 25 having an angular extent of over 180 degrees, e.g. 240 degrees, and a minor sector 27 having an angular extent of less than 180 degrees, e.g. 120 degrees. It will be apparent that the sectors can be installed on tension lines 29 by first positioning them centrally inside of the tension lines with the bundle 28 of electrical conductors passing through central opening 30, slipping the tension lines into peripheral slots 35, and then assembling belt or cinch 31 about the girth of the sectors in annular groove 33.

Peripheral slots 35 have hemicylindric bottoms 34 (see FIG. 4) which fit closely about lines 29. Groove 33 has a radial depth only as great as the radial distance of the axes 36 of the bottoms from the outer periphery of the bulkhead. The bottoms of slots 35 continue right on across and through the bottom of groove 33, as shown at 37 in FIG. 5. When lines 29 are in the bottoms of the slots they protrude into the groove by half their diameters. This means that the hoop tension in belt 31 will have a radial component holding the lines in the slots.

Bulkhead sectors 25, 27 are preferably made of a strong tough rigid plastics material such as polycarbonate, a transparent polymer, e.g. as available under the trade name Lexan. Belt 31 securing the sectors together is preferably made of a strong corrosion resistant metal such as phosphor bronze ribbon or stainless steel.

As shown in FIG. 3, belt 31 is provided with a sleeve 38 through which one end 39 of the belt is threaded and then folded back over inside. Sleeve 38 has a dimple, or depression 40 to guide a punch. When belt 31 has been placed about the body of the bulkhead body, the other end 41 of the belt is passed through the sleeve and interlocked with the sleeve and end 39 of the belt by driving a punch into depression 40. Then end 41 is folded back over the sleeve. Additional or other forms of securement, such as solder, may be employed to hold the ends of the band together about the two sectors of the bulkhead.

After the belt is secured about the bulkhead, the portions of the lines adjacent to the belt are soldered thereto as shown in FIG. 2 at 44, to hold the bulkhead against axial movement relative to said lines.

Referring now to FIG. 6 there is shown a streamer section. Through the outer tube 51, which is transparent, is seen replacement or repair bulkhead 23 assembled therein, along with another bulkhead 11 of the prior art variety. Through the central apertures 30, 15 of these bulkheads passes electric conductor bundle 53. At intervals along bundle 53 are electric components such as hydrophones 55, depth transducers 57, and transformers 59. Tension lines 61 extend through the three equiazimuthally spaced sets of slots 25 in split bulkhead 23. Belt 31 holds together the split bulkhead sectors 27, 27. Pin and socket connectors are provided at the ends 63, 65 of the streamer section to permit it to be connected to adjacent sections for forming a streamer to be towed behind a boat in offshore exploration. Suitable mechanical couplings are included in the connectors to take tension load transmitted via tension lines 61.

Damage to a streamer section bulkhead usually results also in damage to the outer tube. The sharp edges and corners of the broken bulkhead perforate or cut the tube. Except in the case of the most minor of injuries to the tube, which can be repaired by bonding, the tube will be replaced. Whether the tube is to be repaired or replaced, the initial step in repairing the cable section with be removal of the tube. If the tube is to be reused, it will be removed intact by withdrawing the string of electrical conductors, tension lines, and bulkheads from one end of the tube. Otherwise the tube can be cut off. After the broken bulkhead or bulkheads have been repaired, and any damage to the electrical conductors, electrical components, and, on occasion, the tension lines, has been effected, the string will be placed in an outer tube, e.g. by the method described in the aforementioned Hill patent.

Typical situations in which a bulkhead may be damaged include running over the streamer section with a truck, reeling up the streamer cable on board ship during rough weather, snagging a cable on an offshore platform or the lines of a shrimp boat, and being caught between one boat and another or a fixed structure. Although most such accidents not only break a bulkhead but also perforate the outer tube or sheath, the tension lines usually do not part and protect the electrical conductor bundle from parting, and the bulkheads and tension lines usually buffer the electrical components sufficiently to protect them. Therefore a repair by replacing one or more broken bulkheads and a damaged tube is fairly simple and relative inexpensive when bulkheads embodying the invention are employed. On the other hand, if integral bulkheads are employed, both the tension lines and electrical conductor bundle must be cut and spliced each place a bulkhead is to be inserted in the cable, and if very many bulkheads are broken it is uneconomical to repair the cable section. A junked cable section represents a loss of perhaps $10,000 since only the hydrophones can be salvaged. The employment of the invention therefore represents a considerable economic improvement.

Although electrical conductor bundle 28 has been described as though all of its conductors extend the full length of the streamer section, in fact only a portion of the conductors extend all the way from one connector 63 to the other connector 65. Some of the conductors extend only from one connector to various ones of the electrical components. Nevertheless, at any place along the streamer section where a bulkhead is broken and needs to be replaced, there will be a great many electrical conductors which would have to be cut and spliced if an integral bulkhead were used to make the repair.

In the course of repairing a streamer section having a broken bulkhead, it has been indicated above that after the tube or jacket has been removed, the broken bulkheads are removed. A bulkhead which has been run over by a truck may be so damaged that it will fall away from the tension lines and electrical conductors. In other cases, a bulkhead may merely be cracked or chipped and a portion may still be integral with one or more tension lines or electric conductors still threaded therethrough. In the latter case the bulkhead will have to be released by grinding, drilling or sawing or in other manner removing portions large enough to pass the lines and conductors laterally therethrough.

The streamer section as above described refers to mechanical and electrical connection means at the ends of the section, the tube ends being shown as secured to end pieces or plugs by means of metal bands around the tube. One known form of connection means for the streamer section comprises continuation of the tension lines and electrical conductors through the plugs at the ends of the tube, providing the connectors with pin and socket connectors, providing the tension lines with aircraft type fittings or connectors, and then when the lines and conductors have been connected to those of another streamer section, enclosing the connection in a flexible tube or hose section and filling it with oil.

From the foregoing, it will be seen that often a streamer section will have only one split bulkhead according to the invention, such split bulkhead replacing an integral bulkhead which has been damaged. However, a streamer section might include several split bulkheads if several integral ones needed to be replaced. In either case the majority of the bulkheads will be of the integral type. On the other hand, if it were found to be more economical or for other reason desirable to assemble a streamer section using all split bulkheads, that too could be done in accordance with the invention.

While a preferred embodiment of the invention has been shown and described, modifications thereof can be made by one skilled in the art without departing from the spirit of the invention.

I claim:

1. Streamer section comprising
   a flexible plastics material tube,
   connectors at each end of the tube for making electrical and mechanical connection with other sections, flexible tension lines inside said tube interconnecting said connectors for transmitting mechanical tension, electrical components inside said tube distributed at intervals therealong, electrical conductors inside said tube, some of said conductors interconnecting said connectors for transmitting electricity therebetween, others of said conductors connecting one of said connectors with said electrical components, and bulkheads inside said tube disposed at intervals therealong to hold said tube in round and buffer said electrical components, each bulkhead comprising an annular body, said electrical conductors passing through the central apertures in the ones of said annular bodies past which they extend, said tension lines passing through openings adjacent to the outer periphery of each said annular body, said body of at least one of said bulkheads including:

a plurality of body means entirely assemblable relative to the electrical conductors and tension lines as aforespecified without the necessity of threading the conductors and lines axially therethrough, and securement means holding said body means so assembled and entirely assemblable in position to hold said body means so assembled without the necessity of threading the electrical conductors and lines axially therethrough, said body means independent of said securement means providing support for said tension lines against movement radially inwardly toward the axis of the streamer sectors, said body means independently of said securement means forming a circumferentially closed ring about said electrical conductors.

2. Streamer section according to claim 1, said body of said one bulkhead comprising:

a two sector annulus including a major sector of greater than 180 degrees arcuate extent and a correlative minor sector of less than 180 degrees arcuate extent, each sector having sides disposed at an angle to each other.

3. Streamer section according to claim 2, said annulus having an annular groove in its outer periphery, said securement means comprising a girth cinch in said groove, said annulus having a plurality of radial slots in its outer periphery providing said openings for said tension lines, said slots having a radial extent greater than the radial depths of said grooves by an amount less than the diameter of the tension lines received in said slots, said girth cinch engaging said tension lines and holding them in said slots.

4. Streamer section according to claim 1, the annular body of each of a majority of the bulkheads being homogeneously integral, i.e. formed of one piece, with the electrical conductors and tension lines threaded through said central aperture and said openings in the outer periphery of the body, said tube being homogeneously integral along its full length.

5. Bulkhead for a streamer section comprising a two sector annulus adapted to receive an electrical conductor bundle adapted to extend therethrough, said annulus including a major sector of greater than 180 degrees arcuate extent and a correlative minor sector of less than 180 degrees arcuate extent, said annulus having an annular groove in its outer periphery, said annular groove being adapted to receive a girth cinch to hold said sections together, said annulus having a plurality of radial slots in its outer periphery adapted to receive tension lines adapted to extend therethrough, each sector having planar sides disposed at an angle to each other, said planar sides of one sector being engaged with the adjacent planar sides of the other sector.

6. Apparatus according to claim 5, each said slot having a hemi-cylindric bottom adapted to receive a tension line, the bottom of the groove passing through the axes of said hemi-cylindric bottoms, whereby when tension lines are received in said slots they will be engaged and pressed toward the axis of the annulus by a girth cinch in said groove holding the sectors together.

7. Apparatus according to claim 6, said major sector being 240 degrees in extent and carrying two of said radial slots symmetrically positioned thereabout, said minor sector being 120 degrees in extent and carrying one of said radial slots centrally positioned about its cylindric periphery.

8. As applied to a streamer section comprising:

a flexible plastics material tube, connectors at each end of the tube for making electrical and mechanical connection with other sections, flexible tension lines inside said tube interconnecting said connectors for transmitting mechanical tension, electrical components inside said tube distributed at intervals therealong, electrical conductors inside said tube, some of said conductors interconnecting said connectors for transmitting electricity therebetween, others of said conductors connecting one of said connectors with said electrical components, and bulkheads inside said tube disposed at intervals therealong to hold said tube in round and buffer said electrical components, each bulkhead comprising an annular body, said electrical conductors passing through the central apertures in the ones of said annular bodies past which they extend, said tension lines passing through openings adjacent to the outer periphery of each said annular body, the annular body of most of the bulkheads being homogeneously integral, i.e. formed of one piece, with the respective electrical conductors and tension lines threaded through said central aperture and said openings in the outer periphery of the body, the method of repairing such a streamer section wherein one or more bulkheads has become broken comprising the steps of:

removing the tube from the section, removing portions of each broken bulkhead adjacent said central aperture and said openings at the outer periphery of said annular body thereof as required to pass said lines and conductors laterally, removing each broken bulkhead laterally from said tension lines and electrical conductors, and replacing said broken bulkheads with a split bulkhead comprising a plurality of body means which can be assembled relative to the electrical conductors and tension lines as aforespecified without the necessity of threading the conductors and lines axially therethrough and securement means holding said parts together with the body means so assembled.

9. Method according to claim 8, each split bulkhead comprising an annular body divided into two sectors, each sector having one or more slots in its periphery, each split bulkhead being installed by placing said sectors about the electrical conductors to form an annulus and positioning said tension lines in said slots by relative lateral movement, and thereafter placing said securement means around said two sectors to hold said sectors together and hold said lines in said slots.

* * * * *